United States Patent [19]
Miller

[11] 3,795,145
[45] Mar. 5, 1974

[54] VARIABLE THROAT VENTURI AIRSPEED SENSOR

[75] Inventor: Harry Miller, Scottsdale, Ariz.

[73] Assignee: Sperry Rand Corporation, New York, N.Y.

[22] Filed: Mar. 23, 1972

[21] Appl. No.: 237,425

[52] U.S. Cl............... 73/213, 73/180, 73/182
[51] Int. Cl............... G01b 1/00, G01p 5/16
[58] Field of Search..... 73/180, 182, 207, 213, 183; 137/487, 487.5

[56] References Cited
UNITED STATES PATENTS
| | | | |
|---|---|---|---|
| 1,580,679 | 4/1926 | Roucka | 73/207 |
| 2,749,749 | 6/1956 | Billman et al | 73/182 |
| 3,428,079 | 2/1969 | Wylupek | 137/486 |

OTHER PUBLICATIONS

W. Buzzard, Variable Orifice Flow Meter, ISA Journal, March 1963, P. 80 & 81.

Primary Examiner—Richard C. Queisser
Assistant Examiner—John P. Beauchamp
Attorney, Agent, or Firm—Howard P. Terry; Joseph M. Roehl

[57] ABSTRACT

An airspeed sensor utilizes a venturi in which the throat area is adjustable. The fluid pressures in the inlet region and the throat region are measured. The throat area of the duct is programmed by a servo as a function of the pressure ratio between inlet and throat so as to cause the pressure ratio to be a function of the Mach number of the airflow at the entrance to the venturi. An output signal representing the equivalent airspeed is taken from a potentiometer which is energized through a shaping circuit from the inlet region pressure sensor. The setting of the potentiometer is adjusted in accordance with the setting of the variable throat mechanism of the venturi.

10 Claims, 4 Drawing Figures

VARIABLE THROAT VENTURI AIRSPEED SENSOR

BACKGROUND OF THE INVENTION

1. Field of the Invention

This invention relates to an airspeed measuring device and more specifically to a venturi type airspeed measuring device having an extended operating range.

2. Description of the Prior Art

Airflow is frequently measured by means of pitot techniques. However, measurement of low velocity airflow by means of these techniques is limited in that such techniques depend upon a square law relationship between velocity and impact pressure. This results in extremely low sensitivity at the lower speed. Airspeed systems depending upon venturi principles are also frequently used for such measurements. Although the prior art venturi systems manifest an improved sensitivity at the lower airspeeds, their range is somewhat limited so that a device designed to operate at lower airspeeds is unsuitable at the higher airspeeds.

SUMMARY OF THE INVENTION

The venturi-type airspeed sensor of the present invention permits the measurement of air velocity over a wide region by employing a variable throat area which is programmed by a servo as a function of the pressure ratio between inlet and throat so as to cause the pressure ratio to be a function of the Mach number of the airflow at the entrance to the venturi.

DESCRIPTION OF THE PREFERRED EMBODIMENTS

Figure 1:
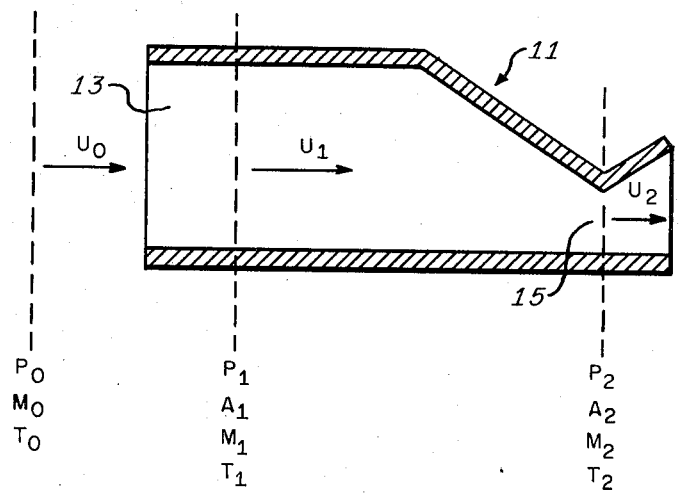
FIG. 1 is a diagram useful in explaining the invention.

FIG. 1 illustrates a typical venturi 11 shown in longitudinal cross section. The fluid whose flow rate is to be measured enters an inlet portion 13 and flows downstream toward the right in the diagram through a constricted throat area 15. The free stream state of the fluid before it enters the venturi is defined by its static pressure $P_o$, its temperature $T_o$ and its Mach number $M_o$. The fluid in this free stream region has a corresponding velocity $U_o$ with respect to the venturi 11. The presence of the constriction in the venturi causes a build up of pressure at the inlet region resulting in a pressure $P_1$, a temperature $T_1$ and a Mach number $M_1$ corresponding to a velocity $U_1$. Although the Mach number in the inlet region of the venturi is less than that of the free stream $M_o$ for practical purposes, the free stream and inlet Mach numbers, as well as their corresponding pressures, may be considered equal. The constriction in the throat region causes an increase in speed over that at the inlet portion. The state of the fluid at the throat is defined by its pressure $P_2$, its temperature $T_2$ and its Mach number $M_2$ corresponding to the velocity $U_2$. The cross sectional area of the inlet portion of the venturi measured at right angles to the direction of the fluid flow may be designated as $A_1$ and the corresponding area in the throat area 15 may be designated as $A_2$.

The degree of constriction in the venturi may be conveniently designated as the ratio $A_2/A_1$. If the throat region were completely closed, the ratio $A_2/A_1$ would become zero and the pressure build up would completely stop the fluid flow. The pressure increase over that of the free stream pressure would be the impact pressure.

When the ratio $A_2/A_1$ is greater than zero as is the case in a venturi device, known empirical expressions may be used to determine the free stream fluid state as a function of the area ratio $A_2/A_1$, the impact pressure, and the pressure at the inlet to the venturi.

Figure 2:
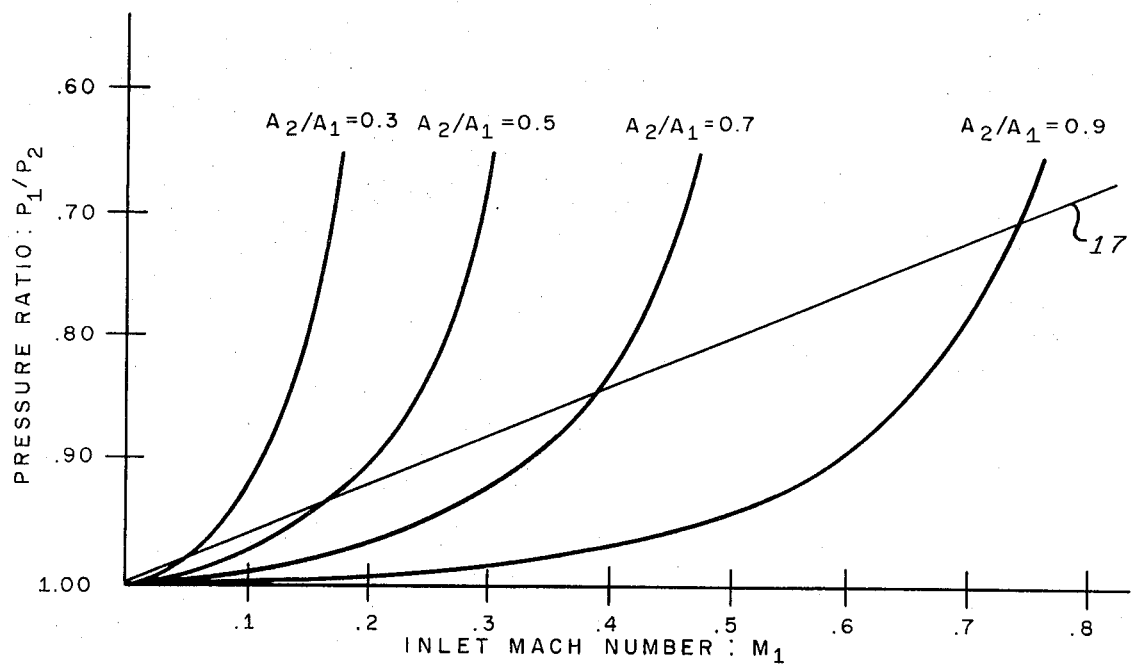
FIG. 2 is a graph illustrating certain characteristics of a device constructed in accordance with the principles of the invention.

Certain operating characteristics of venturi devices may be visualized by referring to FIG. 2, in which the pressure ratios are plotted as a function of inlet Mach number for several venturis having different area ratios. Thus, for example, a venturi having an area ratio of 0.3 will manifest a significant pressure ratio for relatively low Mach numbers. However, such a device will effectively saturate for Mach numbers approaching 0.2. Thus, this venturi would have considerable utility in the lower speeds, but no utility in the medium and upper Mach ranges.

On the other hand, a venturi having an area ratio of 0.9 would display no significant pressure ratio in the lower speed range but would be highly sensitive in the upper speed ranges. Further inspection of FIG. 2 reveals that measurements in the intermediate Mach number ranges can best be made by venturis having intermediate area ratios.

The variable throat venturi of the present invention effectively adjusts the area ratio in accordance with the existing pressure ratio so as to maintain the venturi in a favorable operating region regardless of the particular inlet Mach number being experienced. Ordinarily, the venturi of the present invention is adjusted to operate along a substantially linear operating curve such as the curve 17 of FIG. 2. For the particular characteristics shown in FIG. 2, such a device would provide an area ratio of about 0.3 as the pressure ratio approached unity and a continually increasing area ratio which would become approximately 0.9 when the pressure ratio became 0.70.

It will be appreciated that the particular operating curve 17 of FIG. 2 is merely illustrative of a typical device built in accordance with the principles of the invention. The exact nature of a specific operating curve is determined by the circuit parameters used in a given device as will become evident as the description proceeds.

Assuming that the fluid in which a venturi is to be operated is air, it can be shown that the following relationship exists between the inlet Mach number, the pressure ratio, and the area ratio:

$$M_1^2 = 5 \left\{ \frac{1 - \left(\frac{P_2}{P_1}\right)^{2/7}}{\left(\frac{A_1}{A_2}\right)^2 \left(\frac{P_1}{P_2}\right)^{10/7} - 1} \right\}$$

It can be seen that the foregoing equation is a relationship between three variables, of which two are independent and the third is dependent. In the variable throat venturi system of the present invention, the equation is effectively reduced to an expression containing a single independent variable by forcing the area ratio $A_2/A_1$ to be a specific function of the pressure ratio $P_1/P_2$. This is accomplished by servo positioning the throat mechanism as a function of the pressure ratio. The system operating characteristic is further controlled by the use of a feedback potentiometer as illustrated in FIG. 3.

Figure 3:
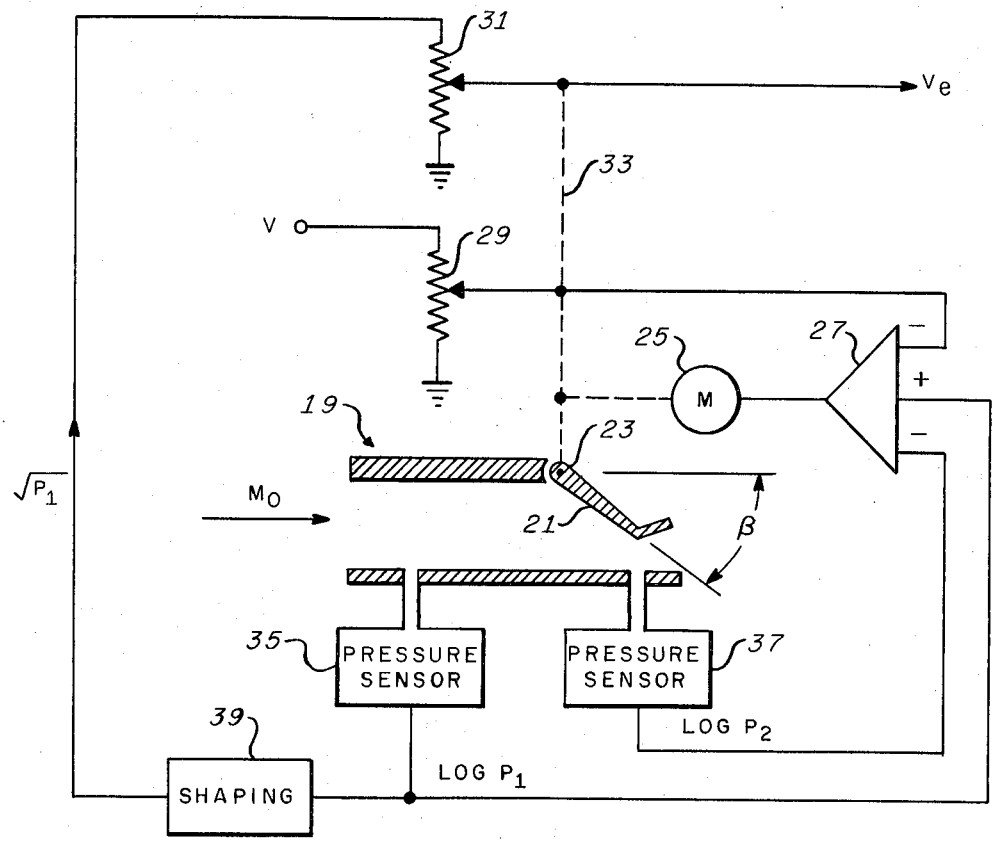
FIG. 3 is a schematic diagram illustrating the principles of the invention.

In FIG. 3, a variable throat venturi, illustrated schematically as element 19, is subjected to an input air flow at a relative free stream velocity $U_o$. A flap-like adjustable throat member 21 is hinged about a transverse axis 23. The angular setting of the throat member 21 is adjusted by means of a servo motor 25 acting in accordance with signals produced by a servo amplifier 27. A feedback potentiometer 29 and a signal output potentiometer 31 each contain adjustable arms whose positions are mechanically set by the servo motor 25, through a shaft 33.

The fluid pressures at the inlet and throat portions are detected by pressure sensors 35 and 37, respectively. As presently preferred, each pressure sensor means includes a transducer designed to produce an output signal representative of the logarithm of the pressure detected by that sensor. The logarithmic signals from each pressure sensor are applied to input terminals of the servo amplifier 27 in a subtractive relationship.

The feedback potentiometer 29 has a linear characteristic with respect to movement of the shaft 33 which also positions the throat mechanism. The output signal from the feedback potentiometer 29 is applied to the servo amplifier 27.

The signal output potentiometer 31 is energized through a shaping circuit 39 in accordance with the output signal of the pressure sensor 35. The shaping circuit 39 converts the logarithmic signal from the pressure sensor 35 into an equivalent signal representing the square root of the pressure sensed by the sensor 35. The shaping circuit 39 is of straightforward design and may, for instance, include a first circuit for taking the anti-logarithm of the input signal and a square root loop. Circuits suitable for this purpose are described, for instance, in "Electronic Analog and Hybrid Computers" by Korn and Korn published by McGraw-Hill Company in 1964 and the references cited therein. As mentioned previously, the feedback potentiometer 29 has a linear characteristic. Since this potentiometer is energized from a source of steady voltage, the feedback signal supplied to the servo amplifier 27 from this potentiometer is a linear function of the angular displacement $\beta$ of the adjustable throat member 21. It can be seen that the area in the throat region of the venturi is a function of the tangent of the angle $\beta$. Furthermore, it can be shown that the angle $\beta$ is equal to a constant determined by the characteristics of the feedback potentiometer 29 minus a multiplying factor times the log of the ratio $P_1/P_2$.

In a particular design, a rectangular venturi had a width of one inch. The center of the axis 23 was 1.559 inches above the inner surface of the lower wall of the venturi. The length of the inner surface of the adjustable throat member between the axis and the apex at its downstream extremity was equal to 2.268 inches. The height of the inlet was 1 inch. For this particular venturi, the area ratio $A_2/A_1$ was given by the following relationship:

$$A_1/A_2 = 1.75 (0.8909 - \tan \beta)$$

The relationship between shaft position $\beta$ and log $(P_2/P_1)$ was given by:

$$\beta = 40.706 - 95.9 \log (P_1/P_2)$$

By substituting terms from the last two mentioned formulas in the first mentioned formula for $M_1^2$, it can be seen that the angle $\beta$, and therefore the position of both potentiometer arms, is a function of the inlet Mach number.

The signal output potentiometer 31 may be proportioned to provide any desired output signal. Thus, equivalent airspeed may be derived from the free stream Mach number and the free stream static pressure by the known formula:

$$V_e = 24.27 \, M_o \, \sqrt{P_o}$$

Where the equivalent airspeed is in knots and the pressure is in pounds per square foot. Since in a practical device $M_o$ is substantially equal to $M_1$ and $P_o$ is substantially equal to $P_1$, this formula may be re-written as $$V_e = 24.27 \, M_1 \, \sqrt{P_1}$$

Since the output potentiometer is energized by a voltage representative of $\sqrt{P_1}$ and the position of the potentiometer arm is a function of $M_1$, the output potentiometer effectively multiplies these two variables. Thus, the output voltage $V_e$ directly indicates the equivalent airspeed being sensed by the venturi. If the venturi were to be used in measuring fluids other than air, the constant 24.27 would be modified accordingly.

It will be appreciated that the characteristics of the operating curve 17 of FIG. 2 can be modified within wide limits by adjusting the circuit parameters in accordance with well known design techniques. Thus, for instance, the sensitivity of the system can be altered by changing the feedback factor. Although a linear characteristic is ordinarily desired, a non-linear characteristic could be provided to meet the requirements of special applications.

Although a specific control circuit has been described, it will be appreciated that many variants of the circuit could be employed to perform the necessary function of adjusting the throat area in accordance with sensed inlet and throat pressures. Thus, for instance, the circuit of FIG. 3 utilizes pressure sensors which provide logarithmic output signals which are subtracted in the servo amplifier 27 so as to provide a signal indicative of the ratio of the two pressures. It will be obvious that any one of a number of known computer schemes for obtaining a signal indicative of the same pressure ratio may be employed if desired.

In some instances, it may be desired to determine the angle of flow of the fluid with respect to the axis of the venturi. Such applications may arise, for instance, in aircraft installations where it may be desired to measure the sideslip or angle of attack of the aircraft.

Figure 4:
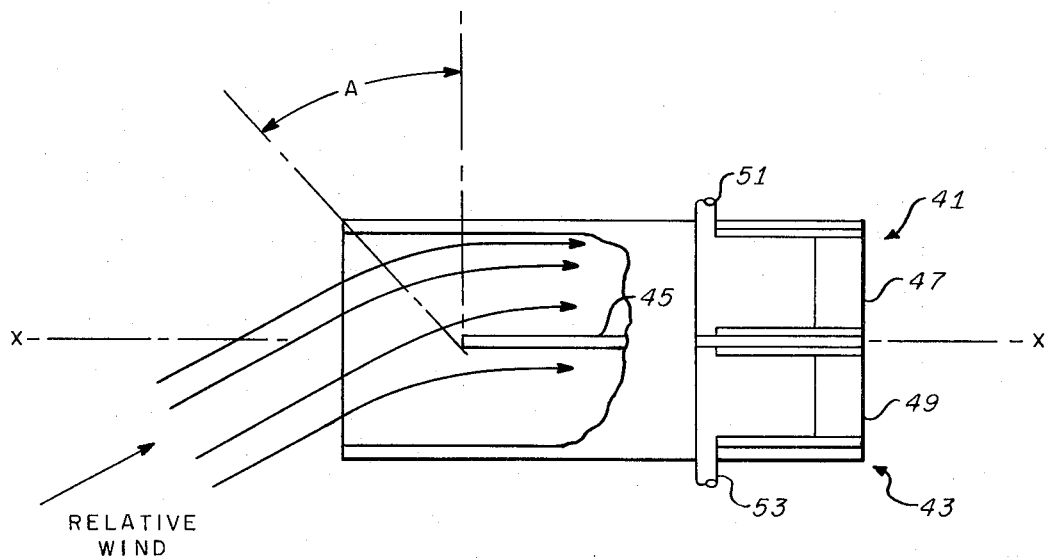
FIG. 4 is an illustration of an embodiment of the invention especially suitable for measuring sideslip.

FIG. 4 illustrates apparatus in which a pair of venturis constructed according to the principles of the present invention may be mounted side by side along the longitudinal axis x—x of an aircraft to provide sideslip indications.

A portion of FIG. 4 has been broken away to show the arrangement of the inlet portion of the venturis. The first venturi 41 and the second venturi 43 have a common wall 45. The adjustable throat members 47 and 49 are independently adjustable about their axes respectively 51 and 53.

The common wall 45 extends only through the downstream portion of the inlet region so that the opening of each venturi makes an angle A with respect to a transverse axis of the venturis. The rate of flow of air through each venturi will be dependent upon the angle and magnitude of the relative wind velocity and the angle A. Thus the effective area of the openings change as the angle between the opening and the relative wind changes. Each of the venturis 41 and 43 is part of a system similar to that of FIG. 3. Therefore, by comparing the equivalent velocities detected by each venturi, the sideslip may be determined by a simple trigonometric computation.

Alternatively, the paired venturis of FIG. 4 may be rotatably mounted on the aircraft and the venturis servoed in a manner to null any pressure difference between the two sensors. In this embodiment, the angle through which the venturis are rotated will be a measure of the sideslip angle. In either embodiment of the invention using dual venturis, the effect is to produce an error signal which can be used directly to indicate the sideslip component or indirectly to adjust the orientation of the venturi in accordance with the error signal. Such error signals may be produced by straightforward techniques. For example, each venturi may employ a system similar to that of FIG. 3 and the two $V_e$ signals may be compared to provide the desired sideslip indication.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. Fluid flow measuring apparatus comprising venturi means, control means, an output means; said venturi means including inlet means having fixed cross-sectional dimensions and throat means having variable cross-sectional dimensions; said control means including means to sense fluid pressures in said inlet and throat means and means to adjust the cross-sectional dimensions of said throat means in accordance with the pressure detected by said sensing means; said output means including an output potentiometer energized in response to the fluid pressure detected by the inlet pressure sensing means and mechanically adjusted by the throat adjusting means in said control means, said output potentiometer further being arranged to provide an output signal at its adjustable arm.

2. Fluid flow measuring apparatus comprising a venturi, control means, an output means; said venturi including an inlet portion having a fixed cross-sectional area and a throat portion having a variable cross-sectional area; said control means including means to sense a fluid pressure differential between said inlet and throat portions and means to adjust the cross-sectional area of said throat portion in accordance with changes in differential pressure detected by said sensing means; said output means including an output potentiometer energized in response to the fluid pressure detected by the inlet pressure sensing means and mechanically adjusted by the throat adjusting means in said control means, said output potentiometer further being arranged to provide an output signal at its adjustable arm.

3. The apparatus of claim 2 wherein said control means includes means to reduce the cross-sectional area of said throat portion in response to a reduction in differential pressure detected by said sensing means.

4. The apparatus of claim 3 wherein said venturi is in the form of a rectangular duct and said throat portion includes a flap-like adjustable throat member rotatable about a transverse axis disposed in one wall of said duct.

5. The apparatus of claim 4 wherein said transverse axis is at the upstream end of said adjustable throat member.

6. The apparatus of claim 5 wherein said adjustable throat member is secured on a rotatable shaft disposed along said transverse axis, and said adjustment means includes a servo motor mechanically coupled to said rotatable shaft, said servo motor being driven in response to the differential fluid pressure detected by said sensing means.

7. The apparatus of claim 6 wherein said differential fluid pressure sensing means includes first and second means to detect the pressure in said inlet and throat portions, respectively, means to convert the detected pressures into electrical signals representative of the logarithms of the detected pressures, and differential amplifying means coupled to receive said electrical signals, said amplifying means being further coupled to drive said servo motor.

8. The apparatus of claim 7 further including a feedback potentiometer mechanically adjusted in accordance with the angular position of said shaft and electrically coupled to the input of said amplifier.

9. The apparatus of claim 8 wherein said feedback potentiometer has a linear resistance characteristic and wherein the adjustable arm of said potentiometer is coupled to the input of said amplifier in a negative feedback relationship.

10. The apparatus of claim 9 further containing signal shaping means for converting the signal from the inlet portion fluid sensing means into an electrical signal equivalent to the square root of the detected pressure and means for energizing said output potentiometer with said square root signal, said output potentiometer being proportioned to provide a resistance characteristic representative of the inlet Mach number and pressure equivalent to each position of the adjustable throat member.

* * * * *